Figure 1:
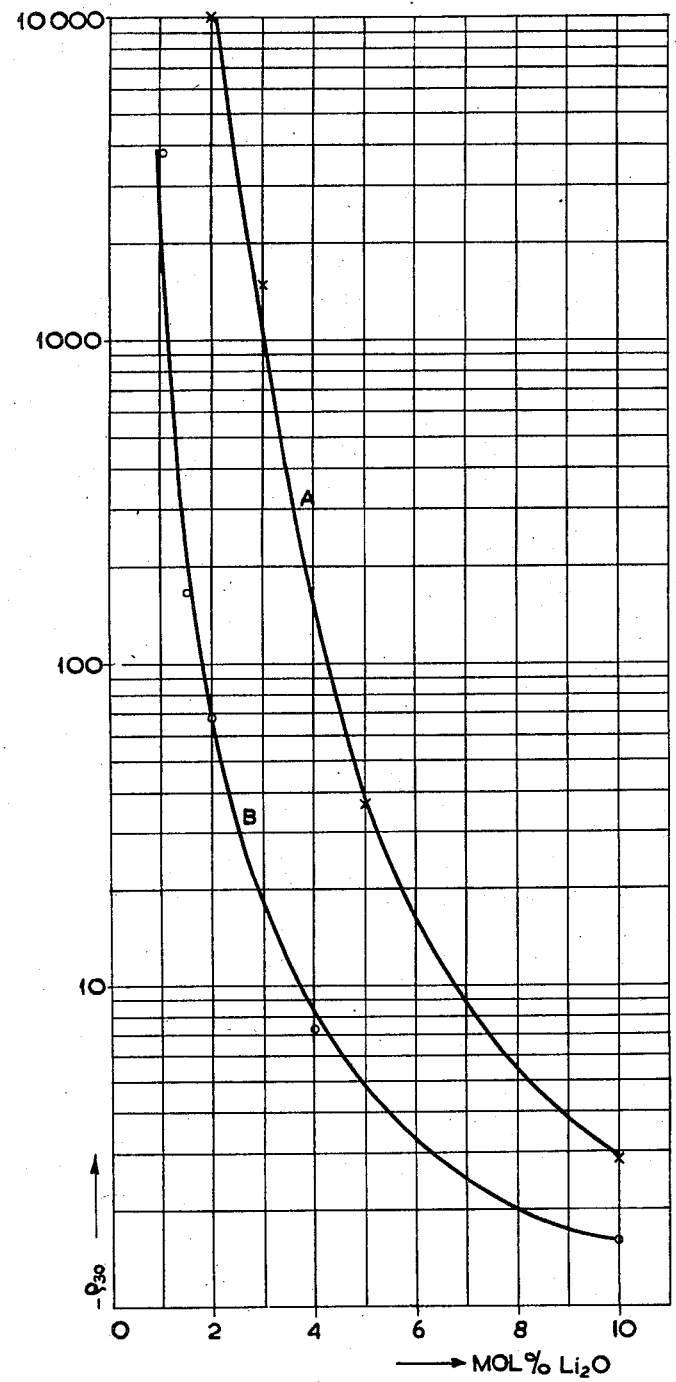

Dec. 9, 1958   A. BOL ET AL   2,863,840
ELECTRICAL RESISTOR
Filed Jan. 25, 1957   2 Sheets-Sheet 1

INVENTOR
ARIE BOL
CHRISTIAAN ALFONS MARIA KLAASSEN
PIETER JOHANNES WILHELMUS JOCHEMS
BY
AGENT

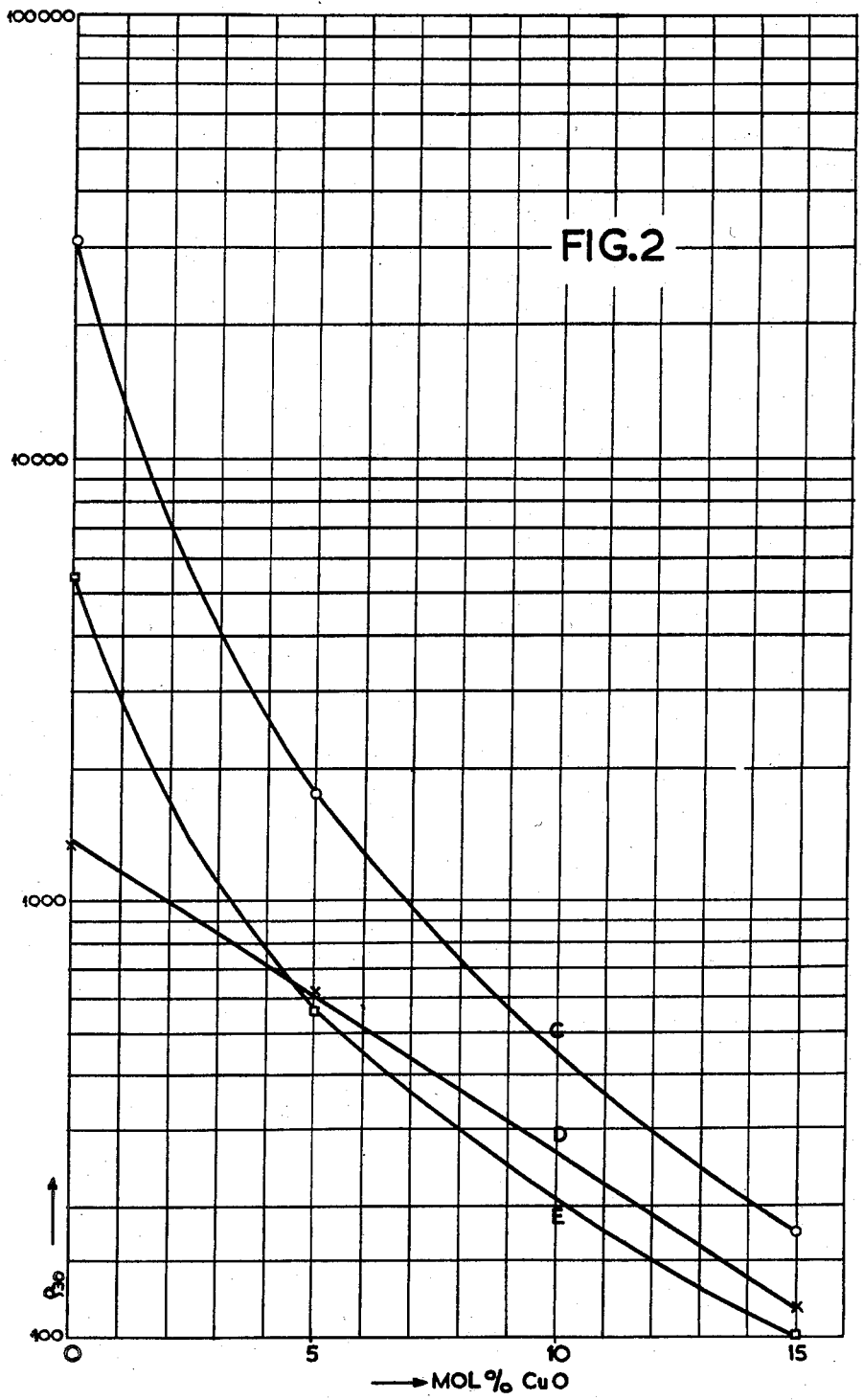

United States Patent Office 2,863,840
Patented Dec. 9, 1958

2,863,840

ELECTRICAL RESISTOR

Arie Bol, Christiaan Alfons Maria Klaassen, and Pieter Johannes Wilhelmus Jochems, Eindhoven, Netherlands, assignors, by mesne assignments, to North American Philips Company, Inc., New York, N. Y., a corporation of Delaware Application January 25, 1957, Serial No. 636,316

Claims priority, application Netherlands January 31, 1956

4 Claims. (Cl. 252—519)

Our invention relates to negative temperature coefficient resistors and to method of producing the same.

U. S. patent application Ser. No. 278,494, filed March 25, 1952, now abandoned, discloses negative temperature coefficient resistors having high negative temperature coefficients and high stabilities which are formed by sintering together lithium oxide and nickel oxide in an oxidizing atmosphere. However, the properties of such resistors vary greatly with the source of the nickel oxide or nickel carbonate used.

A principal object therefore of our invention is to provide a means for neutralizing the variation in the properties of these resistors due to the variation in the source of the nickel oxide or nickel carbonate.

This and other objects of our invention will be apparent from the description that follows:

According to our invention we have found that variations in the properties of a sintered lithium oxide-nickel oxide negative temperature coefficient resistor may be greatly reduced by incorporating a quantity of copper oxide in the resistor. More particularly we have found that the variations in the properties of nickel oxide resistors having a lithium oxide content from 0.1 to 10 mol percent may be greatly reduced by incorporating in these resistors from 1 to 30 mol percent preferably from 10 to 20 mol percent of copper oxide calculated as CuO. The addition of copper oxide in an amount less than 1 mol percent is too small to provide the favorable effects of the invention while the addition of copper oxide in an amount greater than 30 mol percent is not satisfactory since these compositions have a sintering range that is so short that the resistors cannot be easily produced.

The resistors of our invention are produced by mixing oxides of Ni, Li and Cu or compounds which form these oxides upon heating such as lithium carbonate and nickel carbonate, moulding the resultant mixture with the aid of a binding agent such as methylacrylate or starch and sintering the resultant moulded body in an oxidizing atmosphere, preferably air, at a temperature of from about 1100° C. to 1300° C.

Our invention will now be described in greater detail with reference to the following examples, tables and drawing, Figure 1 of which is a graph showing the effect of the addition of a fixed amount of CuO on the specific resistances at 30° C. on nickel-oxide-lithium oxide resistors containing varying amounts of lithium oxide and Figure 2 of which is a graph showing the effect of a variation on the CuO content on the specific resistances at 30° C. of nickel oxide-lithium oxide resistors.

The composition of nickel oxide varies with the source. Certain impurities are usually included in commercial sources of nickel oxide which, it has been found adversely affect the resistance properties of a resistor prepared in accordance with the disclosure of the U. S. application referred to above as indicated in Table 2.

Table 1 shows for a plurality of such initially nickel oxide materials the spectrochemically determined content of impurities in percent by weight.

TABLE 1

|    | I    | II    | III   | IV    | V    | VI    |
|----|------|-------|-------|-------|------|-------|
| Si | .7   | .02   | .004  | .002  | .47  | .047  |
| Fe | .08  | .0007 | .001  | .0015 | .56  | .13   |
| Co | .35  | .005  | .45   | .2    | .24  | .235  |
| Cr | .008 | .007  |       |       |      |       |
| Mn | .0005| .0009 | .0005 | .0002 | .23  | .0012 |
| Mg | .01  | .02   | .005  | .002  | .015 | .024  |
| Pb | .008 | .1    | .006  | .002  |      |       |
| Bi | .015 |       |       |       |      |       |
| Al | .07  | .05   | .003  | .004  | .003 | .04   |
| Sn | .001 | .004  |       |       |      |       |
| Ca | .015 | .04   | .01   | .09   |      |       |
| Cu | .25  | .002  | .003  | .03   | .1   | .135  |
| Ag | .002 | .0001 | .00025|       |      |       |
| Na | .1   | 3     |       |       |      |       |
| Zn |      | .09   | .07   | .02   |      |       |
| As | .15  |       |       |       |      |       |
| Cd |      | .003  | .01   | .0035 |      |       |

The preparation indicated by IV in the table is a nickel carbonate which has been converted by heating into nickel oxide. A portion thereof has been heated at 1200° C. for 5 hours and another portion at 900° C. for 5 hours. These products, which have different reactivities, are indicated hereinafter by IVa and IVb, respectively. Furthermore, a portion of the nickel-oxide preparation V has been made less reactive by heating at 1000° C. for 4 hours. The last-mentioned nickel oxide will be indicated hereinafter by Va.

Example I

Resistors were manufactured from the different nickel oxide preparations corresponding to Table I, in the following manner. The nickel oxide was ground in a ball mill with alcohol for 16 hours with the addition of lithium carbonate in an amount such that the mixture contained 1.5 mol percent of Li$_2$O. The lithium carbonate was prevented from dissolving in the alcohol by the use of alcohol saturated with lithium carbonate. After filtration and drying for example 5 gs. of a solution of 20 gs. of methyl acrylate with a softening agent of 1 ml. of dibutylphthalate in 100 mls. of methyl acetate was added as a binding agent for 100 gs. of powder. Rods of 5 x 5 x 15 mms. were moulded from this mass and sintered in air at 1,240° C. for 1 hour.

The following table, Table 2, shows for resistors obtained from a plurality of nickel oxide preparations with an addition of 1.5 mol percent of lithium oxide the values of the specific resistance at 30° C. ($\rho_{30}$) in Ω cm. and the values in ° K. of the factor B in the formula:

$$\rho_T = A e^{\frac{B}{T}}$$

wherein A indicates a constant, e indicates the base of the natural logarithm, T indicates the absolute temperature and in which $\rho_T$ indicates the specific resistance at the absolute temperature T. As can be noted from the formula the factor B is a measure of the temperature coefficient of the resistor.

TABLE 2

| Nickel oxide +1.5 mol percent of Li$_2$O | $\rho_{30}$ | B     |
|------------------------------------------|-------------|-------|
| I                                        | 22,000      | 3,550 |
| II                                       | 21,000      | 3,330 |
| III                                      | 37,000      | 4,370 |
| IVA                                      | 170,000     | 4,060 |
| IVB                                      | 2,100       | 3,530 |
| V                                        | 31,000      | 3,540 |
| VA                                       | 1,365       | 3,330 |
| VI                                       | 5,425       | 3,430 |

From Table 2 it is clear that there is a considerable variation in the resistance properties of the resistors formed by the method of Example I, due to the source of the nickel oxide and/or the preliminary treatment given to it. Thus it is noted that the values of $\rho_{30}$ vary from 1,365 to 170,000 Ω cm. and the value of B varies from 3,330 to 4,370° K.

*Example II*

Resistors were manufactured according to the method of Example I using the compositions of Table 2 except that part of the nickel oxide was replaced by 15 mol. percent of CuO.

The values of the specific resistance at 30° C. ($\rho_{30}$) in Ω cm. and the values of the factor B in ° K. of the resistors of Example II are shown in Table 3 which follows:

TABLE 3

| Nickel oxide +1.5 mol. percent of Li$_2$O+15 mol. percent of CuO | $\rho_{30}$ | B |
| --- | --- | --- |
| I | 112 | 3,575 |
| II | 155 | 3,510 |
| III | 140 | 3,600 |
| IVA | 300 | 3,965 |
| IVB | 160 | 3,470 |
| V | 176 | 3,450 |
| VA | 118 | 3,330 |
| VI | 100 | 3,250 |

Table 3 shows that the variation in properties between the resistors when using the different nickel-oxide preparations, which for a content of 1.5 mol. percent of Li$_2$O was from 1,365 to 170,000 Ω cm. for the $\rho_{30}$ and from 3,300 to 4,370° K. for the factor B, has been reduced by a content of copper oxide according to the invention to values for the $\rho_{30}$ and the factor B between 100 and 300 Ω cm. and 3,250 and 3,965° K., respectively.

The effect of the addition of copper oxide to lithium oxide-nickel oxide resistors containing varying amounts of lithium oxide is shown in Figure I which is a graph in which the specific resistance $\rho_{30}$ is plotted against the mol. percent of Li$_2$O of various nickel oxide-lithium oxide resistors in which the same source of nickel oxide is used for all the resistors. In the graph curve A represents the effect of a variation in the lithium oxide content on the specific resistance at 30° C., $\rho_{30}$ and curve B represents the effect of a CuO content of 10 mol. percent on the specific resistance $\rho_{30}$ of resistors of a similar content of lithium oxide. The values measured for the specific resistance $\rho_{30}$ in Ω cm. for several of the compositions of these curves, together with the associated values for B in ° K. are specified in Table 4 which follows:

TABLE 4

| Li$_2$O | CuO | $\rho_{30}$ | B |
| --- | --- | --- | --- |
| 2 | ---- | 10,000 | 3,370 |
| 3 | ---- | 1,482 | 3,400 |
| 5 | ---- | 36.8 | 2,460 |
| 10 | ---- | 2.84 | 2,520 |
| 1 | 10 | 3,814 | 3,800 |
| 1.5 | 10 | 166 | 3,100 |
| 2 | 10 | 67 | 3,160 |
| 4 | 10 | 7.3 | 3,000 |
| 10 | 10 | 1.6 | 2,600 |

The effect of the addition of copper oxide is further illustrated by Figure 2 which is a graph in which the specific resistance $\rho_{30}$ is plotted against mol. percent of CuO for nickel oxide-lithium oxide resistors having a Li$_2$O content of 1.5 mol. percent. The curves C, D and E in the graph represent the effect of the addition of copper oxide to resistors in which the source of the nickel oxide corresponds to the aforesaid V, Va and VI.

As can be seen from the graph the variation in the specific resistance due to variation in the source of the nickel oxide decreases with an increase in the addition of the copper oxide.

The values measured for the specific resistance $\rho_{30}$ in Ω cm. for several of the compositions of these curves, together with the associated values for B in ° K., are specified in the Table 5 which follows:

TABLE 5

| Nickel oxide | Li$_2$O | CuO | $\rho_{30}$ | B |
| --- | --- | --- | --- | --- |
| V | 1½ | ---- | 31,000 | 3,540 |
| Va | 1½ | ---- | 1,365 | 3,330 |
| VI | 1½ | ---- | 5,425 | 3,430 |
| V | 1½ | 5 | 1,740 | 3,430 |
| Va | 1½ | 5 | 620 | 3,140 |
| VI | 1½ | 5 | 560 | 3,260 |
| V | 1½ | 15 | 176 | 3,450 |
| Va | 1½ | 15 | 118 | 3,330 |
| VI | 1½ | 15 | 100 | 3,250 |

While we have described our invention in connection with specific embodiments and applications, other modifications thereof will be readily apparent to those skilled in this art without departing from the spirit and scope of the invention as defined in the appended claims.

What we claim is:

1. A sintered electrical resistor having a negative temperature coefficient and consisting essentially of from about 0.1 to 10 mol percent of lithium oxide, about 1 to 30 mol percent of copper oxide, calculated as CuO, and the remainder nickel oxide.

2. A sintered electrical resistor having a negative temperature coefficient and consisting essentially of from about 0.1 to 10 mol percent of lithium oxide, about 10 to 20 mol. percent of copper oxide, calculated as CuO, and the remainder nickel oxide.

3. A method of manufacturing a sintered electrical resistor having a negative temperature coefficient comprising forming a mixture of the oxides of Ni, Li and Cu in amounts such that from about 0.1 to 10 mol. percent of lithium oxide, about 1 to 30 mol. percent of copper oxide calculated as CuO, and the remainder nickel oxide is present, shaping said mixture into a body, and sintering said body at a temperature between about 1100° C. and 1300° C. in an oxidizing atmosphere.

4. A method of manufacturing a sintered electrical resistor having a negative temperature coefficient comprising forming a mixture of compounds which form the oxides of Ni, Li and Cu upon heating in amounts such that from about 0.1 to 10 mol. percent of lithium oxide, about 1 to 30 mol. percent of copper oxide calculated as CuO, and the remainder nickel oxide is present, shaping said mixture into a body, and sintering said body at a temperature between about 1100° C. and 1300° C. in air.

References Cited in the file of this patent

UNITED STATES PATENTS 2,326,580    Trenkle _____ Aug. 10, 1943

FOREIGN PATENTS 545,679    Great Britain _____ June 8, 1942

OTHER REFERENCES

Philips: Res. Rep., vol. 5, pages 173–187, 1950.